CLOTH LAYING,
DIVISION.
Cotton Stretcher
Cotton Manufacturing
Freeman Stocell
7-21-1835
CLASSIFICATION
8988-X
DIVISION.
In the Manufacture of cloth
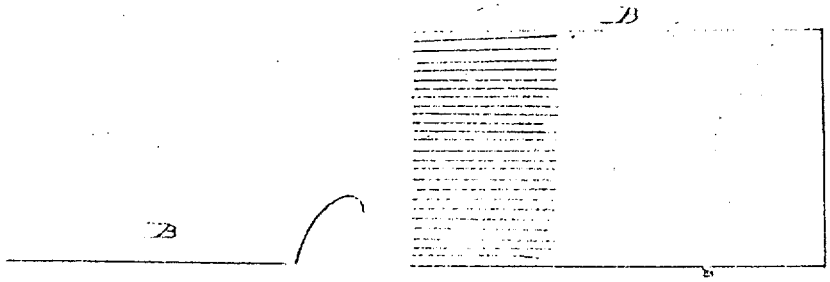
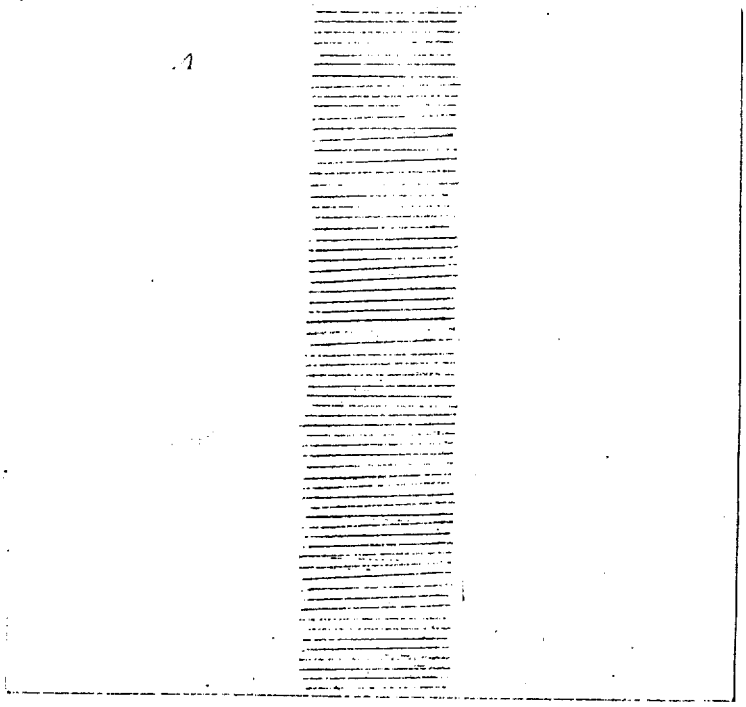

July 21. 1835    8988X    173

Freeman Wolcot. Stow, Massachusetts.

Letters Patent.

The Schedule, referred to in these Letters Patent and making part of the same, containing a description in the words of the said Freeman Wolcott, himself of his improvement in the Manufacture of Cloth.

To all to whom these presents shall come.

Be it known that I Freeman Wolcot of Stow in the County of Middlesex & State of Massachusetts, Machinist, have invented a new and useful improvement in the Manufacture of Cloth & that the following is an [illegible] & full description of the invention. Let a sheet of thin brass plate about five inches wide be rolled until it shall require a proper temper & elasticity then let the same be cut into strips equal in length to the width of such cylinders as are now used for napping cloth with teazles, then let the said plate be divided lengthwise so that the inner edges shall present a range of teeth about three quarters of an inch in length & about one fifteenth of an inch wide at the base dimi=nishing in width from the base to the tip where they terminate in a sharp point, then let a considerable curvature be given to them by [illegible]=ing, that is by placing the plate thus cut over a concave iron mould so fashioned as to give the teeth & plate a proper curvature and then pla=cing a corresponding convex iron over them and giving it a blow with a hammer. The metallic napper will then be complete and will be a plate with a row of curved tapering elastic teeth resembling the teeth of the teazle, and standing out from the uncut part of the plate at such an angle that the uncut part may be attached to slats of wood passing across the face of a cylinder at suitable distances. The teeth are cut by the oblique strokes of a chisel the direction of which is changed each stroke as described in plan marked A. hereto annexed. The two sides of the plate are then drawn apart separating at the points of the teeth & two plates are thus formed from one with a row of teeth on one side

8488X side of each. The teeth may be varied in size to conform to the cloth to be dressed. The metallic napper is represented in plate B. hereto annexed. The invention for which & for the use of which the said Wolcott claims his patent is for making from a sheet of thin brass a plate with curved tapering elastic teeth suitable for napping cloth. And the great merit of the invention is the production of an elastic and enduring article which may be substituted to an almost incalculable extent for the vegetable teazel which is destroyed by a few hours use.

Exd. Witnesses
W.K. B. H. Andrews. Freeman Wolcott
E. Hasket Derby

[532 Words (Drawing.)